United States Patent [19]

Behr et al.

[11] Patent Number: 4,701,358
[45] Date of Patent: Oct. 20, 1987

[54] THERMOPLASTIC FILM WITH INTEGRAL CLOSURES AND RECLOSABLE CONTAINER FORMED THEREFROM

[75] Inventors: Raymond D. Behr; Larry M. Zieke, both of Midland, Mich.

[73] Assignee: The Dow Chemical Company, Midland, Mich.

[21] Appl. No.: 756,906

[22] Filed: Jul. 19, 1985

Related U.S. Application Data

[62] Division of Ser. No. 591,662, Mar. 21, 1984, Pat. No. 4,562,027.

[51] Int. Cl.⁴ .................... B65D 33/16; B65D 33/24
[52] U.S. Cl. ...................................... 428/35; 428/99; 428/100; 428/338; 383/63; 383/65
[58] Field of Search ............ 383/63, 65; 428/99, 428/100, 35, 338

[56] References Cited

U.S. PATENT DOCUMENTS

| | | | |
|---|---|---|---|
| Re. 29,331 | 8/1977 | Naito | 383/63 X |
| 3,338,284 | 8/1967 | Ausnit | 383/65 |
| 3,372,442 | 3/1968 | Ishimatsu | 383/63 X |
| 3,827,472 | 8/1974 | Uramoto | 383/63 X |
| 4,279,677 | 7/1981 | Takahashi | 383/63 X |
| 4,295,919 | 10/1981 | Sutrina et al. | 383/63 X |
| 4,354,541 | 10/1982 | Tilman | 428/100 X |
| 4,479,244 | 10/1984 | Ausnit | 383/63 |
| 4,527,314 | 7/1985 | Fisher et al. | 24/587 |

FOREIGN PATENT DOCUMENTS 2133462  7/1984  United Kingdom .............. 428/100

*Primary Examiner*—Joseph L. Schofer
*Assistant Examiner*—F. M. Teskin
*Attorney, Agent, or Firm*—L. E. Hessenaur, Jr.

[57] ABSTRACT

An improved cast process and apparatus for fusing closure elements, particularly those with thickened bases, to separately extruded film or sheet stock for making containers with integral reclosable closures. The process is applicable to webs of film which contain more than one pair of closure elements. The web is split immediately adjacent the die exit between adjacent pairs of closure elements to achieve a film having essentially erect closure elements and associated ribs should they be included. The process also permits beaded edges along both sides of the film. Improved containers can thus be produced.

7 Claims, 4 Drawing Figures a# THERMOPLASTIC FILM WITH INTEGRAL CLOSURES AND RECLOSABLE CONTAINER FORMED THEREFROM This is a divisional of application Ser. No. 591,662, filed Mar. 21, 1984, now U.S. Pat. No. 4,562,027.

BACKGROUND OF THE INVENTION

This invention relates to the method of in-line forming of integral fasteners with film or sheet stock to be made into bags or other containers which are reclosable by the fastener elements. It is parcticularly directed to a cast process wherein a single film and sheet carries more than one pair of fastener elements such as illustrated, for example, in FIG. 3 of U.S. Pat. No. 4,295,919. In the invention of U.S. Pat. No. 4,295,919, a pair of male elements are located in the central section of the sheet and female elements are located adjacent opposite edges of the sheet. In some cases, the film between the center two fasteners is thickened. When the film is slit between the fasteners, the thickened film becomes the lip that is grasped to open the bag. The thickened lip resists tearing when the bag is opened. When the film is thickened between the fasteners, they converge as they travel from the die to the chill roll. The lateral translation of each center fastener causes it to tip. To compensate for this tipping, fasteners in the past have been pre-tipped at the die.

Earlier methods designed at splitting the film web to accomplish the same purpose were not satisfactory, such slitting of the film web ocurring away from the die. Such remote slitting permitted the two center fastener elements to move together as they travelled from the die to the chill roll in response to lateral forces associated with lateral stress. This lateral movement of the fasteners in turn caused them to tip.

The pre-tipping solution has not been fully satisfactory in that the degree of necessary pre-tipping cannot accurately be anticipated, particularly with varying resins and process conditions, and cannot be adjusted responsively once the pre-tipping attitude is die cut into the die-plates. Failure to have the male profile in the proper attitude can result in unsatisfactory or less than totally satisfactory performance of the fastener elements forming the closure. Also, in such an arrangement, particularly where there is a base under a closure profile, a thinning of the film occurs adjacent the profile, which could result in unwanted film tearing.

SUMMARY OF THE INVENTION

It is desirable to extrude integral fasteners or closures on film such that the film will have thick edges and that the fastener profiles on the film stand upright so that when formed into a container, the engaging profiles will readily interlock and disengage when desired. In experimenting to avoid distortion of the closure profiles, and thin edges along sides of the film, in instances where a single extruder die is extruding a plurality of pairs of closures on a single sheet, it was discovered that splitting of the sheet adjacent the die in the machine direction between pairs of closures will essentially eliminate the distortion and thin edges. It was found that by doing so, the profiles nearer the center of the sheet will be similarly disposed as those towards the edges, and the edges of the sheet will be of a similar thickness adjacent each profile of each closure pair. This is particularly advantageous where there is a base under the closure profiles. The problem of thinning of the film adjacent the closure base is also substantially obviated by this procedure.

DETAILED DESCRIPTION OF THE DRAWING

DETAILED DESCRIPTION OF THE DRAWING

Figure 1:
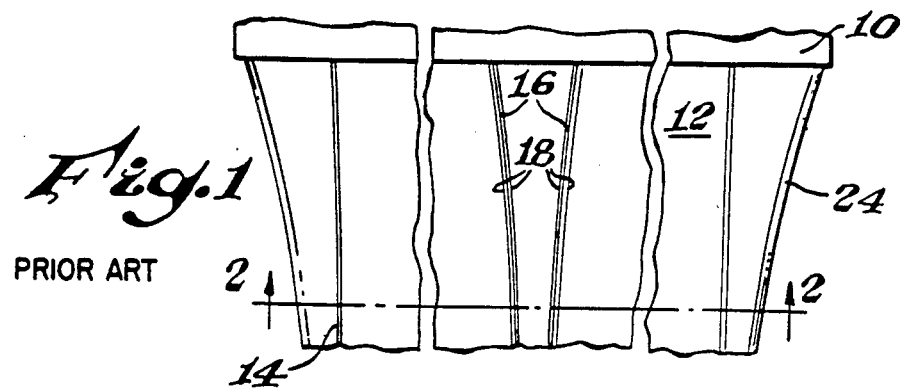
FIG. 1 is a plane view of an unslit web illustrating practice in the prior art.
Figure 3:
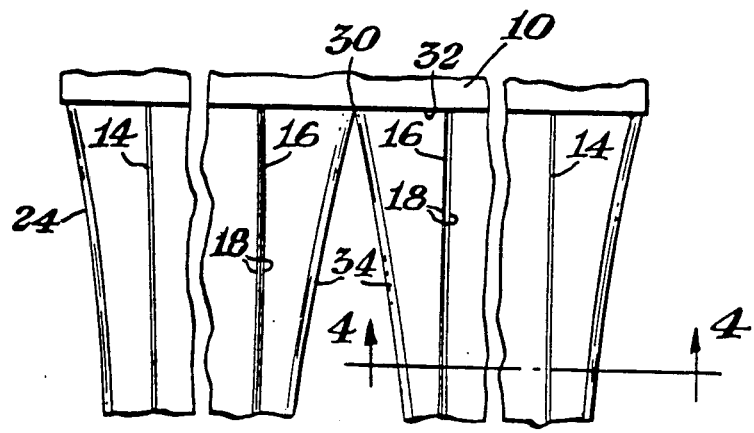
FIG. 3 is a plane view of the split web illustrating practice in accordance with the process of the present invention.

Prior to the present invention, it was common to extrude from a standard die 10 as shown in FIG. 1, a film or sheet 12 of a sufficient width for two reclosable containers each having a female reclosable fastener or profile 14 and a male reclosable fastener or profile 16, as for example, illustrated in FIG. 3 of U.S. Pat. No. 4,295,919. However, in this particular case, the male profiles have additional ribs 18 on each side thereof and the film portion 20 below the male profiles is thicker, by a factor of about two or more, than the film portion 22 which runs along the majority of the width of the film. This thickened portion 20 can be obtained by profiling the film extrudate or by laying a separate base layer on the film or extruding an extra base layer with the profile itself. Another thickened portion 24 is formed at the edge of the film.

Figure 2:
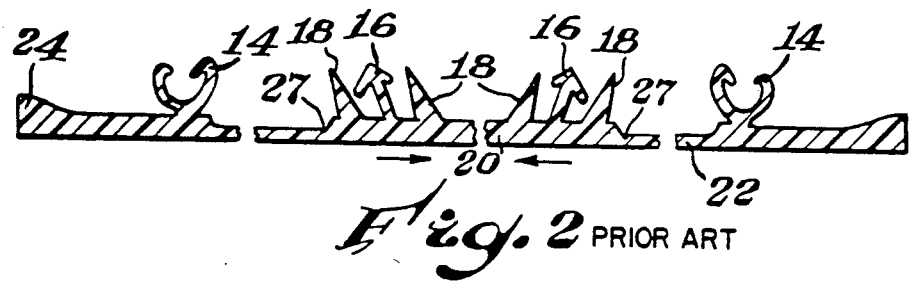
FIG. 2 is an enlarged cross-sectional view of FIG. 1 taken along the line 2—2 with portions broken away.

As more clearly seen from FIG. 2, the primary difficulty which has been found is that there is a considerable tipping of the male profiles 16, as well as their associated ribs 18 when included, the profile and ribs slanting toward the outside edge 24 of each side of the film. This is believed to be caused by lateral translation of the base of two male profiles (moving toward one another as illustrated by the arrows in FIG. 2) by lateral forces associated with the lateral stress in the film set up as a result of the various thicknesses in the extruded film at portions 20 and 22. For example, if the film portion 20 is twice as thick as the film portion 22, then the lateral forces or the necking-down forces during extrusion would be twice as great at the center as at the edges. To attain a balance of forces, bases move toward one another causing the tips of the profiles to slant towards the film edges. This degree of tipping will make it more difficult to engage the closures when the film is formed into a container and there can actually be interference between the male profile 16 and the adjacent ribs 18 if the slanting is severe enough.

Also occurring because of the lateral shifting of the fastener base and lateral stresses are thin spots or depressions 27 where the thicker portion 20 of the film joins the thinner portion 22 of the film. The film at the thin spot 27 can be less than half the thickness of thin portion 22. This thinning-down at depressions 27 can form a point of weakness which can subject the container to tearing at this point.

To compensate for the tipping illustrated in FIGS. 1 and 2, the die plates within the die 10 were actually cut so as to be pre-tipped, tilted in the opposite direction, as much as about 22 degrees. This, of course, did nothing to remove thin spots 27. The solution did work some-what to obviate the tipping problem, but there was often overcompensation or undercompensation and it would be generally rare when the profiles and the associated ribs, particularly when used in that combination, would be in the most desirable perpendicular attitude. Part of this would be due to different operating conditions and different materials. Also when the film was split down later in the process, the film edge adjacent to the male profile and adjoining ribs 18 would remain at about the thickness 20 and not be thickened noticeably. That edge would be thinner than the edge 24 of the film outside of profile 14. It is normally desirable to have both edges of the film in a similar thickened disposition so that tearing possibilities are minimized when the edges of this film are handled.

It has been discovered that if the film is split as it immediately exits the die, as illustrated in FIG. 3, for example, nearly all of the prior problems that were experienced, as enumerated above, were either eliminated or substantially eliminated. This splitting of the web can be accomplished by putting a deckle at exit point 30 across the height of the die lips 32 or even just a simple wire across the height of the die lips 32 at exit point 30. To achieve maximum beneficial effect, the splitting should be at or closely adjacent to the die lips 32. With such slitting, the length of the die lips is increased to provide a total film width equivalent to product made by the prior practice.

Figure 4:
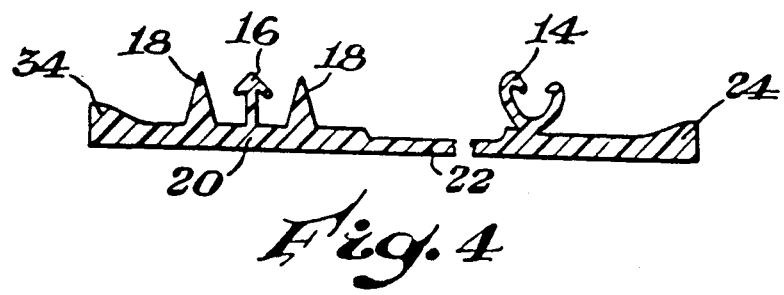
FIG. 4 is an enlarged cross-sectional view of FIG. 3 taken along the line 4—4 which is one side of FIG. 3, the other side not shown being the mirror image thereof.

As can be seen from FIG. 4, which is the right-hand side of FIG. 3 in cross-section, the resulting disposition of the profile 16 and the ribs 18 is that they are essentially fully erect (perpendicular to the film) and thus have no tilt. Also, the thinning at depression 27 is substantially minimized so that depression 27 between the section 20 and the section 22 has no significant adverse effect on the container itself. In addition, the edge 34 of the film towards the outside of the profile 16 and its ribs 18, is thickened in a manner similar to the edge 24 adjacent the outer edge of profile 14, thus giving the film balance and avoiding notching tendencies on either edge of the film forming a container. The edges 24 and 34 can be typically about three times as thick as portion 22 of the film.

As is apparent from the description and drawings above, a substantially improved product can be made by employing the concepts of this present invention by splitting the film immediately adjacent the die lips. While certain representative embodiments and details have been shown for purposes of illustrating the invention, it will be apparent to those skilled in the art that various changes and applications can be made therein without departing from the spirit and scope of the invention, for example, the film or sheet stock or fastener profiles can be made of various other resin materials and the size, color and shape of the components can be varied; the number of fastener members extruded onto a film or sheet face can vary; and the actual design and configuration of the container can vary from flexible bags to rigid containers and equivalent hardware can be substituted.

According, what is claimed as new is:

1. A film containing integrally extruded reclosable fastener profiles wherein each of the fastener profiles contains a base thicker than said film and is substantially perpendicular to the surface of the film and wherein said film has thickened edges along each of the sides thereof, said thickened edges being thicker than both said base and film and extending from said surface of the film in the same direction as said fastener profiles.

2. A reclosable container formed from the film of claim 1.

3. The film of claim 1 wherein at least one of said profiles includes ribs on either side thereof and the thickened base thereunder extending under said ribs, said ribs also being substantially perpendicular to the surface of the film.

4. The film of claim 1 wherein each of said thickened edges is of about the same thickness as the other to provide balance to the film as well as to avoid edge notching.

5. The film of claim 3 wherein said edges are at least about three times as thick as said base.

6. The film of claim 3 wherein each of said thickened edges is of about the same thickness as the other to provide balance to the film as well as to avoid edge notching.

7. The film of claim 6 wherein said edges are at least about three times as thick as said base.

* * * * *